(12) United States Patent
Vermeersch et al.

(10) Patent No.: US 10,107,387 B2
(45) Date of Patent: Oct. 23, 2018

(54) SHIFT LEVER ASSEMBLY WITH PARK SHIFT ASSIST MECHANISM

(71) Applicant: Steering Solutions IP Holding Corporation, Saginaw, MI (US)

(72) Inventors: Michael C. Vermeersch, Essexville, MI (US); Arthur W. Nellett, Davison, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 124 days.

(21) Appl. No.: 15/177,420

(22) Filed: Jun. 9, 2016

(65) Prior Publication Data

US 2016/0290494 A1    Oct. 6, 2016

Related U.S. Application Data

(63) Continuation of application No. 13/920,849, filed on Jun. 18, 2013, now Pat. No. 9,447,867.

(60) Provisional application No. 61/661,089, filed on Jun. 18, 2012.

(51) Int. Cl.
| | |
|---|---|
| *B60K 20/00* | (2006.01) |
| *G05G 5/00* | (2006.01) |
| *F16H 59/10* | (2006.01) |
| *F16H 61/24* | (2006.01) |
| *F16H 59/02* | (2006.01) |

(52) U.S. Cl.
CPC ............. *F16H 59/10* (2013.01); *F16H 61/24* (2013.01); *F16H 2059/0295* (2013.01); *F16H 2061/243* (2013.01); *F16H 2061/245* (2013.01); *F16H 2061/247* (2013.01); *Y10T 74/2014* (2015.01)

(58) Field of Classification Search
CPC ....... F16H 2061/247; F16H 2059/0295; F16H 2061/241; F16H 2061/245; G05G 2009/04766; G05G 5/065
See application file for complete search history.

(56) References Cited

U.S. PATENT DOCUMENTS

| | | |
|---|---|---|
| 5,094,115 A | 3/1992 | Michihira et al. |
| 6,382,045 B1 | 5/2002 | Wheeler |
| 8,499,661 B2 | 8/2013 | Rake et al. |
| 2002/0178855 A1 | 12/2002 | Giefer et al. |
| 2010/0024584 A1 | 2/2010 | Giefer et al. |
| 2010/0071506 A1 | 3/2010 | Kliemannel et al. |
| 2013/0333507 A1 | 12/2013 | Vermeersch et al. |

*Primary Examiner* — Jake Cook
(74) *Attorney, Agent, or Firm* — Cantor Colburn LLP

(57) ABSTRACT

A park shift assist mechanism of a shift lever assembly for a vehicle is provided. The park shift assist mechanism includes a pressing portion configured to apply a pressing force and a follower configured to cause rotation of a gear shift lever from a reverse position to a park position when the gear shift lever is positioned between the reverse position and the park position in response to the pressing force being applied to the follower.

8 Claims, 8 Drawing Sheets

US 10,107,387 B2

SHIFT LEVER ASSEMBLY WITH PARK SHIFT ASSIST MECHANISM

This patent application is a continuation of U.S. patent application Ser. No. 13/920,849, filed Jun. 18, 2013, which claims priority to U.S. Provisional Patent Application Ser. No. 61/661,089, filed Jun. 18, 2012, which is incorporated herein by reference in its entirety.

BACKGROUND OF THE INVENTION

The following description relates to a column mounted transmission gear shift lever, and in particular, a column mounted transmission gear shift lever having a mechanism to assist movement of the gear shift lever into a park position.

Vehicles may include a column mounted transmission gear shift lever to shift between different gear positions of the transmissions. A column mounted gear shift lever typically relies on an operator to manually complete a shifting motion to actuate the transmission in to the desired gear position.

A transmission may include a leaf spring mechanism within the transmission to overcome frictional forces of the entire system if the operator inadvertently does not complete shifting motion. If the frictional forces are too high, there could be a misalignment between the gear shift lever and the transmission.

Accordingly, it is desirable to provide a supplemental artificial feel mechanism which is more in sync with the transmission in order to reduce occurrences of the misalignment described above. Further, it may be most advantageous to provide such a mechanism when the gear shift lever is reentering the park position.

SUMMARY OF THE INVENTION

According to an exemplary embodiment of the present invention, there is provided a park shift assist mechanism of a shift lever assembly for a vehicle. The park shift assist mechanism includes a pressing portion configured to apply a pressing force and a follower configured to cause rotation of a gear shift lever from a reverse position to a park position when the gear shift lever is positioned between the reverse position and the park position in response to the pressing force being applied to the follower.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, exemplary embodiments of park shift assist mechanisms 10 are provided. Exemplary park shift assist mechanisms 10 may be configured to maintain alignment between a gear shift lever 23 and a vehicle transmission (not shown).

In an exemplary embodiment, a gear shift assembly may be mounted to a steering column of a vehicle. The gear shift assembly includes a gear shift lever 23 that is movable between a plurality of shift lever positions, each corresponding to a unique gear position (i.e., operating mode) of the vehicle transmission. The gear shift lever 23 and gear shift assembly are operably connected to the vehicle transmission so as to facilitate shifting between operating modes of the transmission (e.g., from one gear position to another gear position or from a driving mode, in which a driving gear is engaged to a vehicle power-plant, to a parking mode, in which the transmission is disengaged from the powerplant) according to a position or a movement of the gear shift lever 23.

Figure 1:
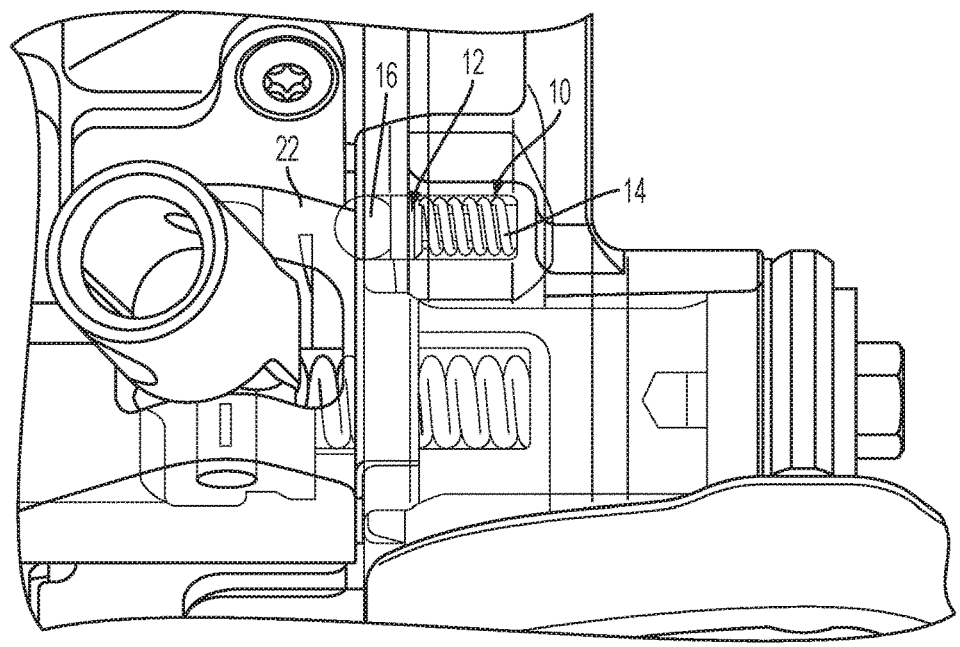
FIG. 1 illustrates a park shift assist mechanism according to an exemplary embodiment of the present invention.
Figure 2:
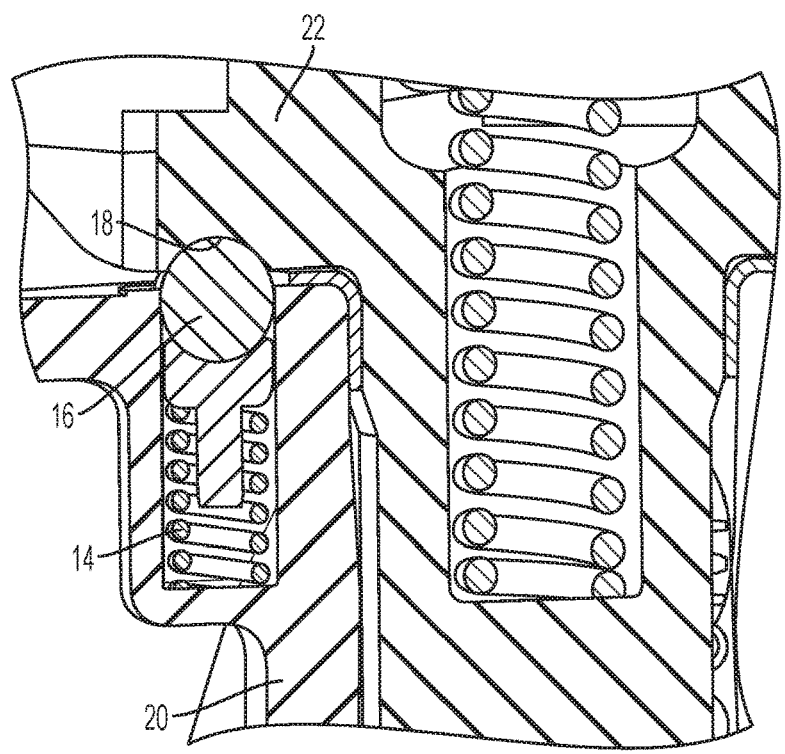
FIG. 2 illustrates the park shift assist mechanism according to the first exemplary embodiment of the present invention.

FIGS. 1-6 illustrate a park shift assist mechanism 10 according to an exemplary embodiment of the present invention. With reference to FIGS. 1 and 2, the park shift assist mechanism 10 includes a pressing portion. The pressing portion is configured to apply a pressing force. In an exemplary embodiment, the pressing portion includes biasing means such as a spring-loaded bearing follower 12 comprising a spring 14 and a roller ball 16. The park shift assist mechanism 10 also includes a follower in the form of a bearing ramp 18, in which the roller ball 16 is positioned. The bearing ramp 18 is configured to cause rotation of a gear shift lever 23 in response to the pressing force being applied to the bearing ramp 18.

The spring loaded bearing follower 12 is positioned in a support bracket 20 and the bearing ramp 18 is positioned on a gear clevis 22. The gear clevis 22 is operably connected to a gear shift lever 23 and movable therewith. The roller ball 16 is urged toward the bearing ramp 18 and moves within the ramp as the gear clevis 22 is rotated between different positions corresponding to different gears of the transmission.

Figure 4:
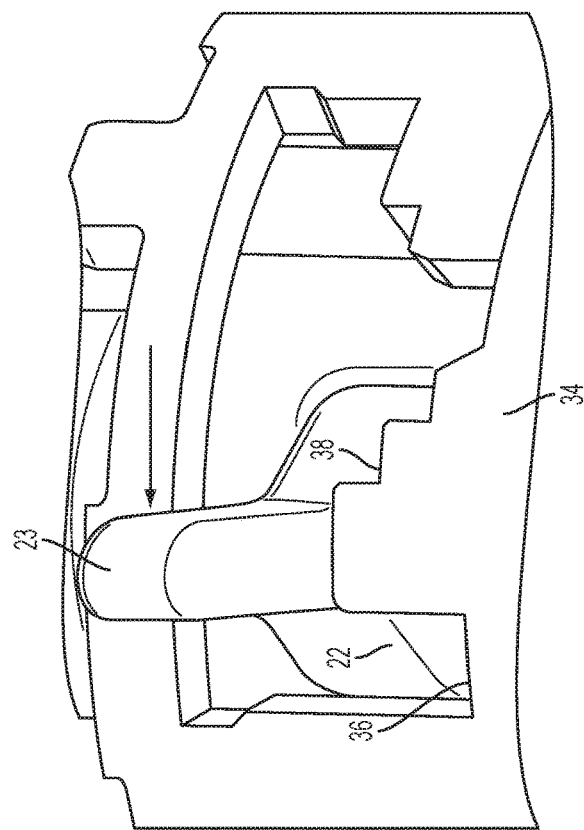
FIG. 4 illustrates the park shift assist mechanism according to the first exemplary embodiment of the present invention.
Figure 3:
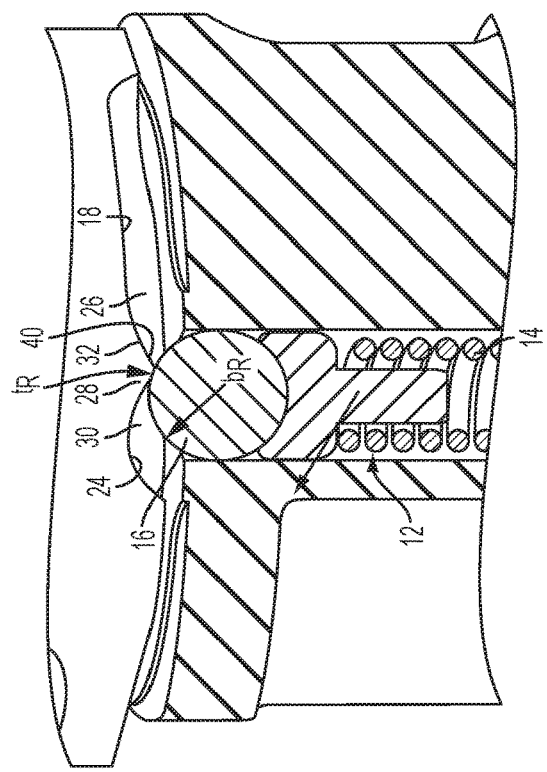
FIG. 3 illustrates the park shift assist mechanism according to the first exemplary embodiment of the present invention.

With reference to FIGS. 3 and 4, the bearing ramp 18 includes a first portion 24 and a second portion 26 separated from the first portion 24 by a detent finger 28. In an exemplary embodiment, the first portion 24 corresponds to a park position of the gear shift lever 23. The second portion 26 corresponds to a plurality of other positions of the gear shift lever 23. The detent finger 28 separates the park position from a reverse position in the second portion 26.

The detent finger 28 includes a first ramp 30 that extends into the first portion 24 and a second ramp 32 that extends into the second portion 26. The first ramp 30 extends from a tip region 40 of the detent finger 28 towards the first portion 24. The second ramp 32 extends from the tip region 40 of the detent finger 28 towards the second portion 26. The tip region 40 has a tip region radius of curvature, $t_R$, and the roller ball 16 has a roller ball radius of curvature, b, that is less than the tip region radius of curvature, $t_R$. In operation, if an operator only moves the gear shift lever 23 partially to the park position, such that the gear shift lever 23 is between the park position and the reverse position, the spring loaded bearing follower 12 acts to positively position the gear shift lever 23 in either the park position or the reverse position.

For example, and with further reference to FIG. 3, if the gear shift lever 23 is positioned between the park position and the reverse position as shown in FIG. 4, the roller ball 16 is positioned proximate to the detent finger 28 between the first portion 24 and the second portion 26 of the bearing ramp 18. The roller ball 16 is urged against the detent finger 28 by the spring 14.

The roller ball 16, when urged against the detent finger 28, acts against either the first ramp 30 or the second ramp 32 to positively position the gear shift lever 23 in either park position or the reverse position. The spring 14 supplies to the pressing force to the roller ball 16.

FIG. 4 shows the gear clevis 22 and gear shift lever 23 together with a gear position detent 34. The gear position detent 34 includes a plurality of detent positions corresponding to various gears of the vehicle transmission. For example, the gear position detent 34 includes a park position detent 36 and a reverse position detent 38. The spring loaded bearing follower 12 is configured to urge the gear shift lever 23 to either the park position detent 36 or reverse position detent 38 if the gear shift lever 23 is positioned between the park position and reverse position.

Thus, in this embodiment, the spring loaded bearing follower 12 is fixed against movement in a shifting direction, i.e., a direction of rotation of the gear clevis 22 and/or gear shift lever 23 to shift between gears of the transmission, and the bearing ramp 18 moves relative to the spring loaded bearing follower 12 in the shifting direction to positively position the gear shift lever 23.

Figure 5:
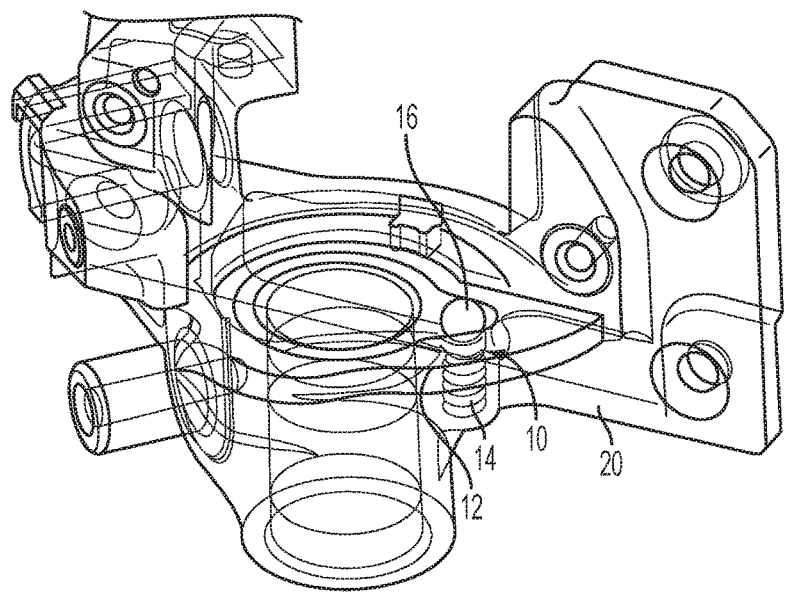
FIG. 5 illustrates the park shift assist mechanism according to the first exemplary embodiment of the present invention.
Figure 6:
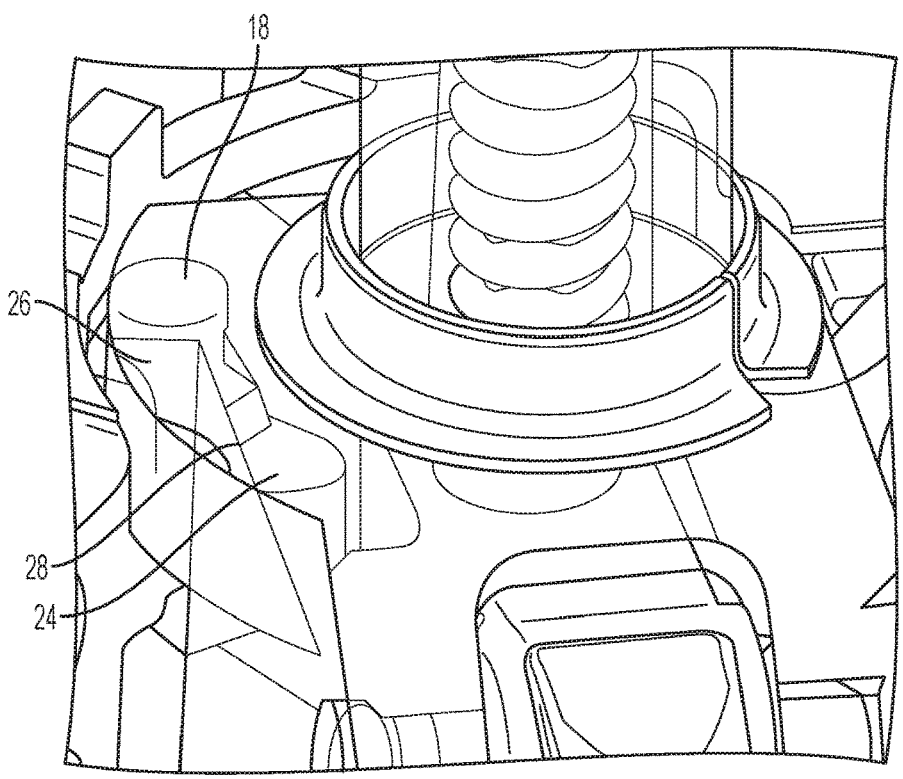
FIG. 6 illustrates the park shift assist mechanism according to the first exemplary embodiment of the present invention.

FIGS. 5 and 6 show additional views of the park shift assist mechanism 10. For example, FIG. 5 shows the spring loaded bearing follower 12 and FIG. 6 shows the bearing ramp 18 positioned on a shaft of the gear shift lever 23.

It is understood that the bearing ramp 18 is not limited to being positioned on the gear clevis 22. Rather, the bearing ramp 18 may be positioned on the gear shift lever 23 or on another feature that moves with the gear clevis 22 or gear shift lever 23, such as a shaft or adapter. In addition, the gear clevis 22 may be formed integrally with the gear shift lever 23 or separately therefrom.

FIGS. 7-10 illustrate a park shift assist mechanism 110 according to a second exemplary embodiment of the present invention. The park shift assist mechanism 110 includes a pressing portion in the form of a spring loaded bearing follower 112 having a spring 114 and roller ball 116, and a follower in the form of a bearing ramp 118 similar to the park shift assist mechanism 10 described above. The pressing portion is configured to apply a pressing force and the bearing ramp 118 is configured to cause rotation of a gear shift lever 23 in response to the pressing force being applied to the bearing ramp 118.

However, in this embodiment, the positions of the spring loaded bearing follower 12 and bearing ramp 18 are reversed. That is, in this exemplary embodiment, the spring loaded bearing follower 112 is positioned on the gear clevis 22 or gear shift lever 23, and the bearing ramp 118 is position on the support bracket 20.

The park shift assist mechanism 110 of this embodiment operates in the same manner as the park shift assist mechanism 10 described above to urge a gear shift lever 23 to either a park position or a reverse position. For convenience, similar parts in this embodiment are identified using the same reference numbers used above, except where other reference numbers are specifically provided. In addition, description of similar parts may be omitted below for convenience.

Figure 7:
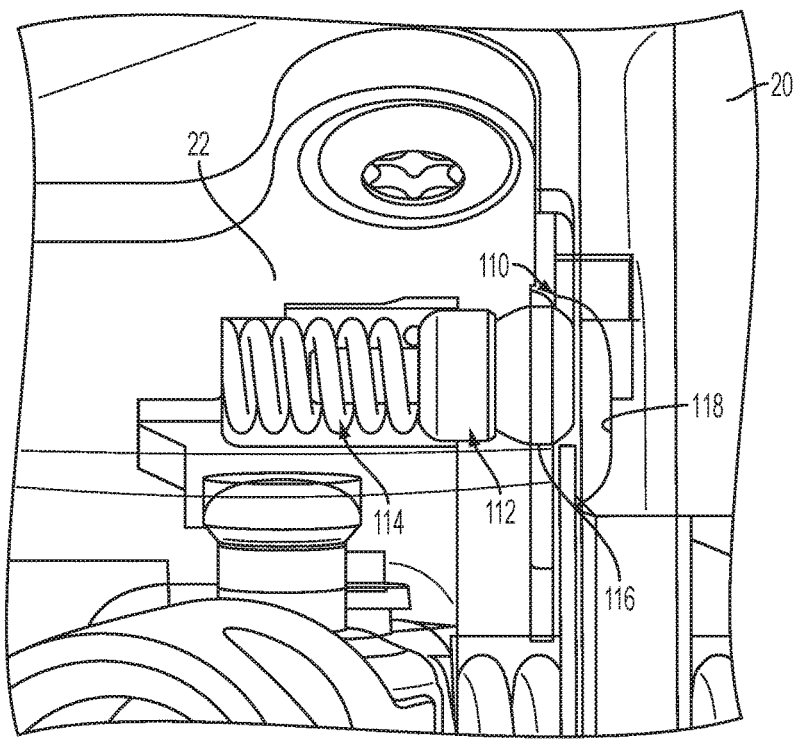
FIG. 7 illustrates a park shift assist mechanism according to a second exemplary embodiment of the present invention.

FIG. 7 illustrates the park shift assist mechanism 110 including a pressing portion in the form of a spring loaded bearing follower 112 having a spring 114 and roller ball 116 mounted in a shaft of the gear clevis 22. The roller ball 116 is urged toward the bearing ramp 118 by the spring 114.

Figure 8:
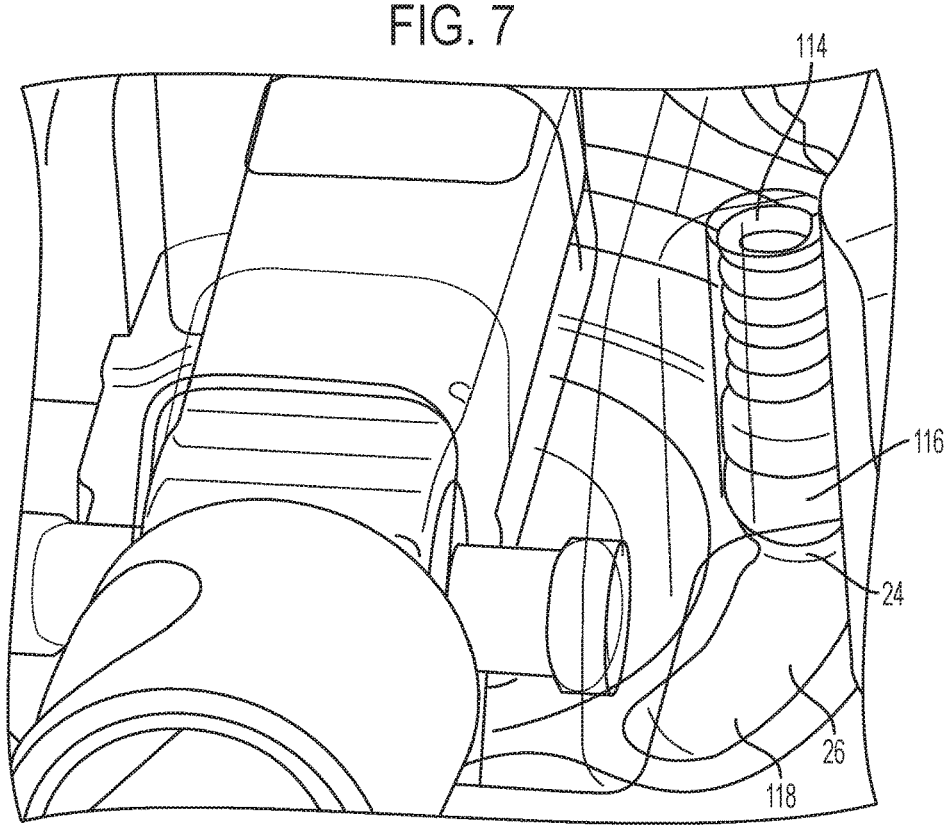
FIG. 8 illustrates the park shift assist mechanism according to the second exemplary embodiment of the present invention.
Figure 9:
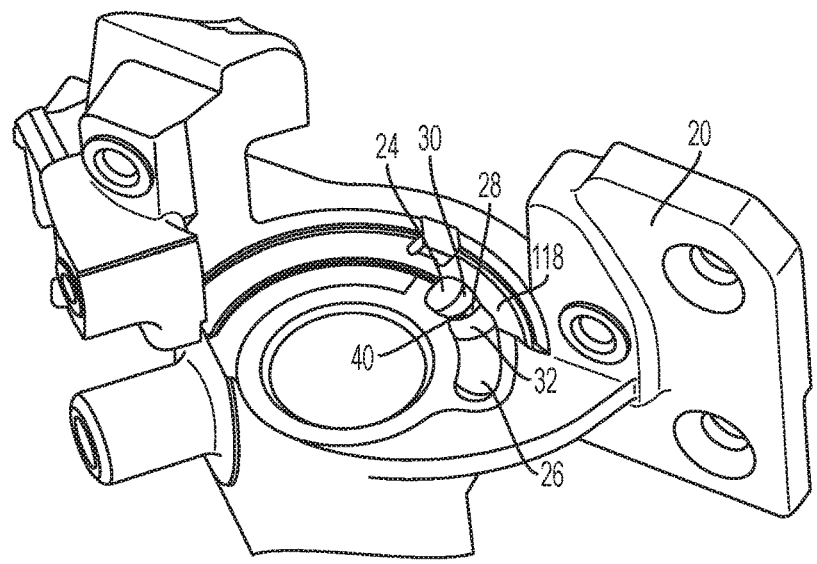
FIG. 9 illustrates the park shift assist mechanism according to the second exemplary embodiment of the present invention.

FIGS. 8 and 9 illustrates the bearing ramp 118 formed in the support bracket 20. The bearing ramp 118 is formed as a track in the support bracket 20. The bearing ramp 118 includes a first portion 24 and a second portion 26 separated by a detent finger 28. In an exemplary embodiment, the first portion 24 corresponds to a park position of the gear shift lever 23 and the second portion 222 corresponds to a plurality of gear positions of the gear shift lever 23. The detent finger 28 includes a first ramp 30 and second ramp 32.

In operation, the roller ball 116 is urged against the bearing ramp 118 by spring 114. The pressing force is supplied by the spring 114. As described above, when the gear shift lever 23 is positioned between the park position and the reverse position, the roller ball 116 is acts against the detent finger 28 and first ramp 30 or second ramp 32 to positively position the gear shift lever 23 in one of the park position or the reverse position. Accordingly, the gear shift lever 23 may be properly aligned with the gear of the vehicle transmission.

Thus, in this embodiment, the bearing ramp 118 is fixed against movement in the shifting direction, and the spring loaded bearing follower 112 moves relative to the bearing ramp 118 in the shifting direction to positively position the gear shift lever 23.

Figure 10:
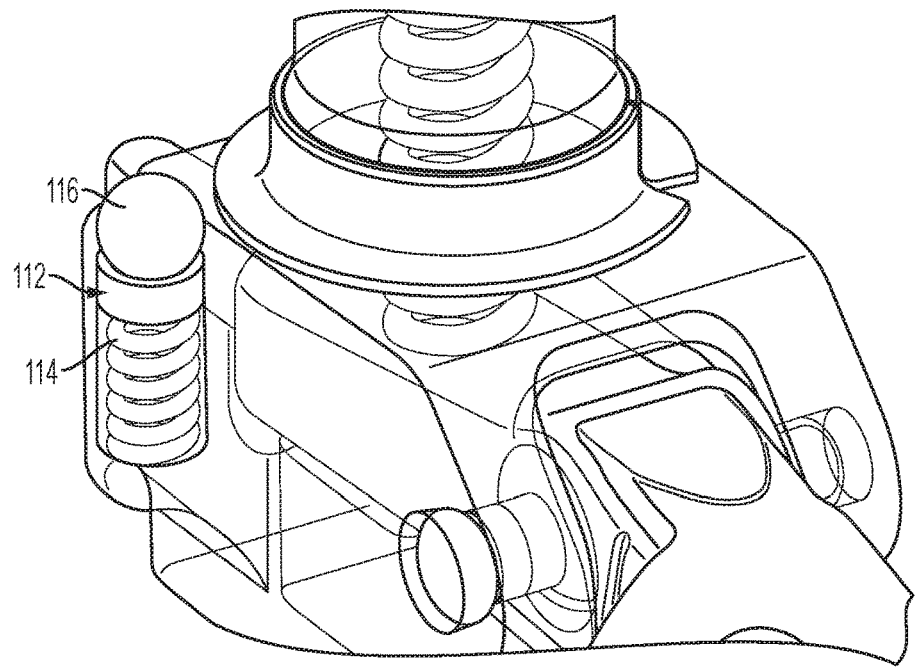
FIG. 10 illustrates the park shift assist mechanism according to the second exemplary embodiment of the present invention.
Figure 11:
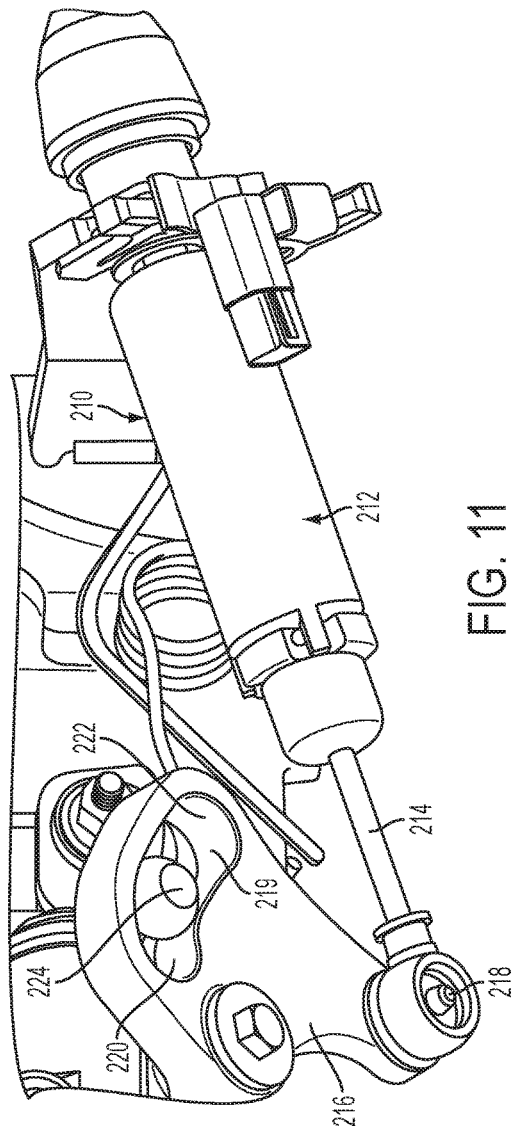
FIG. 11 illustrates a park shift assist mechanism according to a third exemplary embodiment of the present invention.
Figure 12:
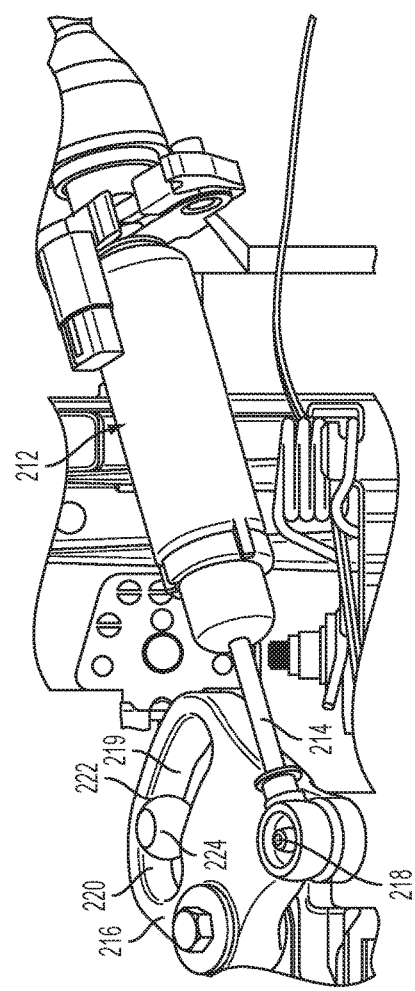
FIG. 12 illustrates the park shift assist mechanism according to the third exemplary embodiment of the present invention.
Figure 13:
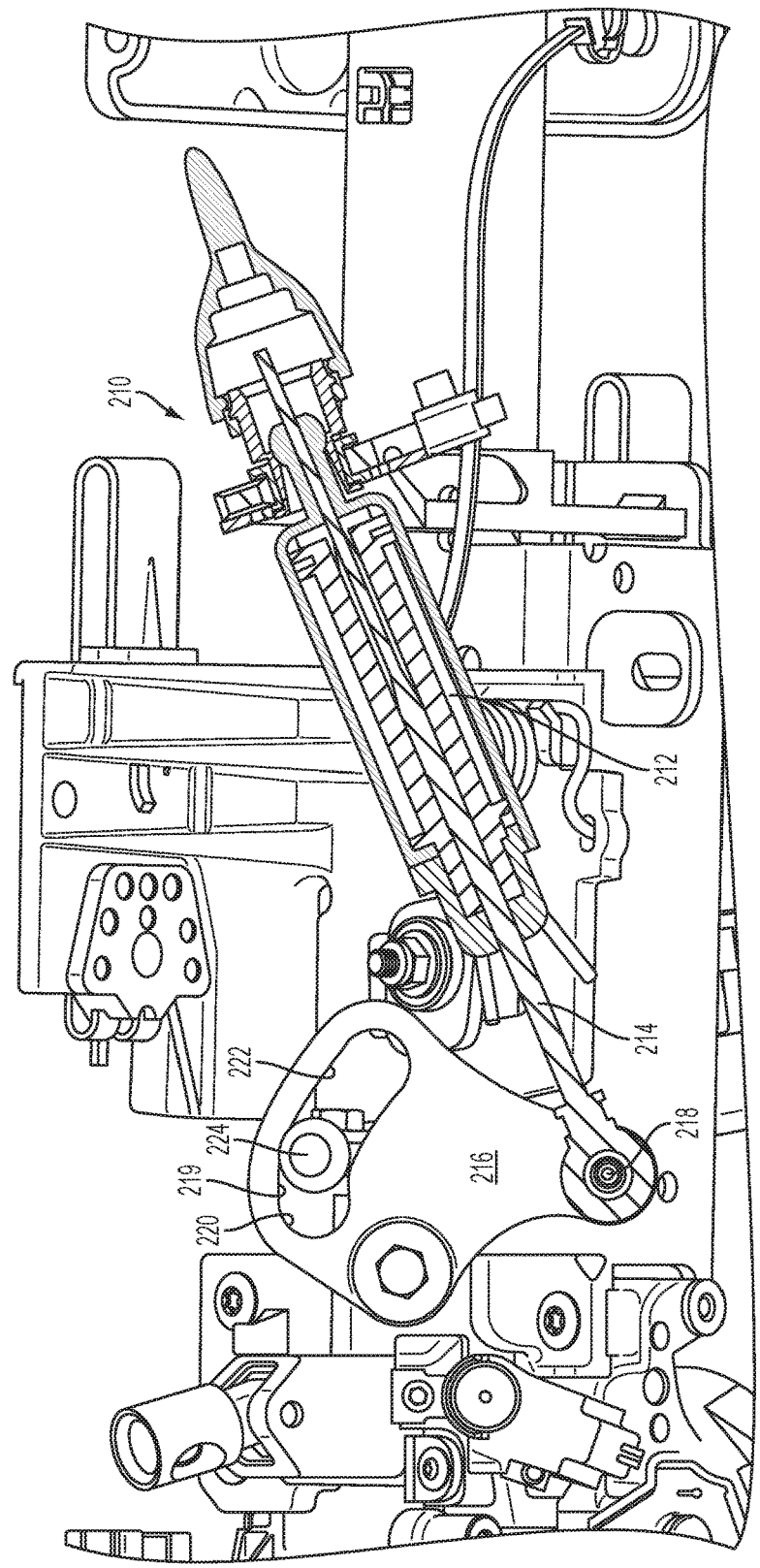
FIG. 13 illustrates the park shift assist mechanism according to the third exemplary embodiment of the present invention.

FIG. 10 illustrates an alternative view of the spring loaded bearing follower 112 including the spring 114 and the roller ball 116 in accordance with an exemplary embodiment of the present invention.

FIGS. 11-16 illustrate a park shift assist mechanism 210 according to a third exemplary embodiment of the present invention. In this exemplary embodiment, and with reference to FIGS. 11-13, the park shift assist mechanism 210 includes a pressing portion formed as an electronic park assist solenoid 212. The park assist solenoid is configured to apply a pressing force via an armature 214. The armature 214 is movable between a plurality of positions corresponding to different gear positions of a gear shift lever 23.

The park shift assist mechanism 210 also includes a follower in the form of a shift plate 216. In an exemplary embodiment the shift plate 216 is configured to cause rotation of the gear shift lever 23 in response to the pressing force being applied to the shift plate 216. The shift plate 216 is pivotable between a plurality of positions corresponding to different gear positions of the gear shift lever 23. The shift plate 216 includes a connection pin 218 that is operable connected to one end of the armature 214 of the 214 of the electronic park assist solenoid 212. The shift plate 216 also includes a positioning groove 219. In an exemplary embodiment, the positioning groove 219 may include a first portion 220 corresponding to a park position of the gear shift lever 23 and a second portion 222 corresponding to a plurality of other gear positions of the gear shift lever 23. A positioning pin 224 extends within the positioning groove 219. The positioning pin 224 may be positioned at different locations along the positioning groove 219 due to pivoting of the shift plate 216.

Figure 14:
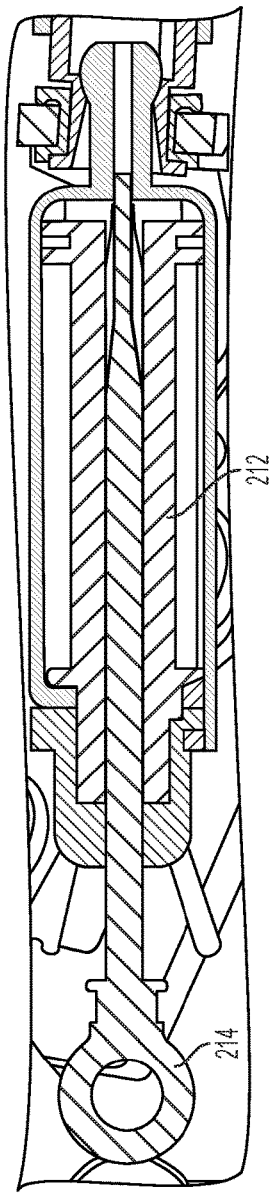
FIG. 14 illustrates the park shift assist mechanism according to the third exemplary embodiment of the present invention.
Figure 15:
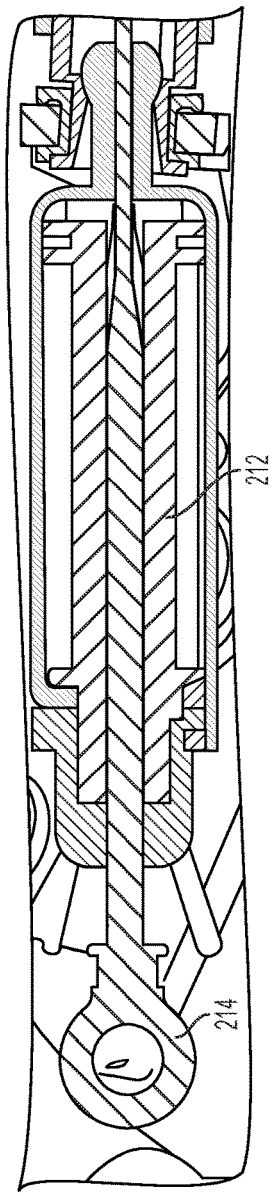
FIG. 15 illustrates the park shift assist mechanism according to the third exemplary embodiment of the present invention.
Figure 16:
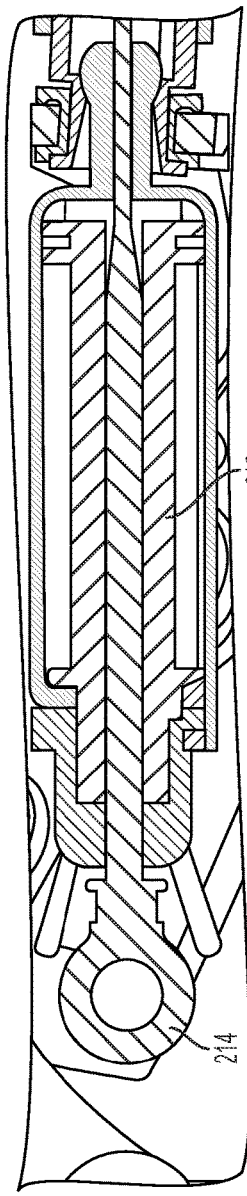
FIG. 16 illustrates the park shift assist mechanism according to the third exemplary embodiment of the present invention.

FIGS. 14-16 illustrate the armature 214 of the electronic park assist solenoid 212 moving between different positions corresponding to different gear positions of the gear shift lever 23. The armature 214 is connected to the shift plate 216 in such a way that pivoting of the shift plate 216 causes the armature 214 move, or alternatively, movement of the armature 214 causes the shift plate 216 to pivot. That is, the armature 214 may apply a pressing force to the shift plate 216 to cause the shift plate 216 to pivot.

In an exemplary embodiment, the armature 214 is retracted as it moves from a position corresponding to a neutral gear position (FIG. 14) to a position corresponding to a reverse gear position (FIG. 15). The armature 214 is further retracted as it moved from the position corresponding to the reverse gear position (FIG. 15) to a position corresponding to the park gear position (FIG. 16). As the armature 214 moves between the park and reverse positions, a magnetic field assists the gear shift lever 23 into the park position. That is, a magnetic field may be used to assist the armature 214 moving toward the park position. In turn, the armature 214 may pivot on the shift plate 216 toward the park position of the gear shift lever 23.

In an exemplary embodiment, the gear shift lever 23 may be operably connected to the shift plate 216, such that movement of the gear shift lever 23 between different positions causes the shift plate 216 to rotate.

The electronic park assist solenoid 212 may be operatively connected to a control unit (not shown). The control unit and/or the electronic park assist solenoid 212 may be connected to at least one sensor to detect the position of the gear shift lever 23. The sensor or sensors may be positioned at any location where the position of the gear shift lever 23 may be detected, and detect, for example, movement and position of the armature 214, movement and position of the shift plate 216, and the position of the positioning pin 224 in the positioning groove 219. Accordingly, the control unit may detect when the gear shift lever 23 is between the reverse position and the park position and activate the magnetic field to assist the gear shift lever 23 into the park position. Alternatively, the magnetic field may automatically be activated upon the armature 214 reaching a predetermined position in the electronic park assist solenoid 212.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A park shift assist mechanism, comprising:
a spring loaded bearing follower that is positioned in a support bracket that is disposed adjacent to a gear clevis that is operably connected to a gear shift lever, the gear shift lever being movable between a park position and a reverse position, the spring loaded bearing follower comprising a spring and a roller ball biased towards a bearing ramp positioned on and extending into the gear clevis by the spring, the bearing ramp having a first portion, a second portion, and a detent finger disposed between and separating the first portion from the second portion, the detent finger includes a first ramp that extends from a tip region of the detent finger towards the first portion and a second ramp that extends from the tip region of the detent finger towards the second portion.

2. The park shift assist mechanism of claim 1, wherein the tip region of the detent finger has a tip region radius of curvature and the roller ball has a roller ball radius of curvature that is less than the tip region radius of curvature.

3. The park shift assist mechanism of claim 2, wherein the first portion corresponds to the park position of the gear shift lever and the second portion corresponds to the reverse position of the gear shift lever.

4. The park shift assist mechanism of claim 3, wherein the detent finger is positioned on the bearing ramp at a location corresponding to a position of the gear shift lever between the reverse position and the park position.

5. The park shift assist mechanism of claim 4, wherein when the gear shift lever is positioned between the park position and the reverse position, the roller ball is disposed on the detent finger and the spring applies a pressing force to the roller ball to urge the roller ball against at least one of the tip region, the first ramp, and the second ramp of the detent finger.

6. The park shift assist mechanism of claim 5, wherein in response to the roller ball being urged against the tip region and the first ramp, the gear shift lever is positively positioned towards the park position.

7. The park shift assist mechanism of claim 5, wherein in response to the roller ball being urged against the tip region and the second ramp, the gear shift lever is positively positioned towards the reverse position.

8. A park shift assist mechanism, comprising:
a gear clevis that is operably connected to a gear shift lever that is movable between a park position and a reverse position, the gear clevis having a bearing ramp that includes a first portion, a second portion, and a detent finger separating the first portion from the second portion, the detent finger having a tip region with a tip region radius of curvature; and a spring loaded bearing follower including:
- a spring, and
- a roller ball biased towards the bearing ramp by the spring, the roller ball having a roller ball radius of curvature that is less than the tip region radius of curvature, when the gear shift lever is positioned between the park position and the reverse position, the roller ball is disposed on the detent finger and the spring applies a pressing force to the roller ball to urge the roller ball against the tip region of the detent finger to positively position the gear shift lever towards at least one of the park position and the reverse position.

* * * * *